United States Patent
Huang et al.

(10) Patent No.: US 11,810,391 B2
(45) Date of Patent: Nov. 7, 2023

(54) METHOD FOR IMAGE PROCESSING CIRCUIT AND RELATED SAMPLING CIRCUIT

(71) Applicant: NOVATEK Microelectronics Corp., Hsin-Chu (TW)

(72) Inventors: Yu-Hsiang Huang, Taoyuan (TW); Jung-Chen Chung, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 13 days.

(21) Appl. No.: 17/577,382

(22) Filed: Jan. 18, 2022

(65) Prior Publication Data
US 2022/0358783 A1    Nov. 10, 2022

Related U.S. Application Data

(60) Provisional application No. 63/184,806, filed on May 6, 2021.

(51) Int. Cl.
| | |
|---|---|
| *G06V 40/12* | (2022.01) |
| *G06V 10/30* | (2022.01) |
| *G06V 10/36* | (2022.01) |
| *G06V 40/13* | (2022.01) |
| *G06V 10/94* | (2022.01) |
| *H04N 25/75* | (2023.01) |

(52) U.S. Cl.
CPC .......... *G06V 40/1347* (2022.01); *G06V 10/30* (2022.01); *G06V 10/36* (2022.01); *G06V 10/955* (2022.01); *G06V 40/1318* (2022.01); *H04N 25/75* (2023.01)

(58) Field of Classification Search
CPC .......... G06V 40/1347; G06V 40/1318; G06V 10/30; G06V 10/36; G06V 10/955; H04N 25/75
See application file for complete search history.

(56) References Cited

U.S. PATENT DOCUMENTS

| | | | |
|---|---|---|---|
| 2020/0285882 A1* | 9/2020 | Skovgaard Christensen | ............... G06V 10/806 |
| 2022/0351432 A1* | 11/2022 | Wang | ....................... G06T 3/403 |
| 2023/0076799 A1* | 3/2023 | Chou | ..................... H04M 1/026 |

FOREIGN PATENT DOCUMENTS

| | | | | |
|---|---|---|---|---|
| CN | 209496381 U | | 10/2019 | |
| CN | 110599388 A | * | 12/2019 | ........... G06T 1/0064 |
| CN | 111881873 A | | 11/2020 | |
| WO | WO-2021168666 A1 | * | 9/2021 | ........... G06K 9/0004 |

OTHER PUBLICATIONS

Ling et al. (the machine translation of Chinese patent document CN-110599388-A) (Year: 2019).*
Jiang et al. (The machine translation of WIPO patent document WO-2021168666-A1) (Year: 2021).*

* cited by examiner

*Primary Examiner* — Bobbak Safaipour
*Assistant Examiner* — Wassim Mahrouka
(74) *Attorney, Agent, or Firm* — Winston Hsu

(57) ABSTRACT

A method for an image processing circuit includes steps of: receiving a fingerprint image; performing a low-pass filtering on the fingerprint image to remove a moiré signal on the fingerprint image, to generate a filtered image; and performing a data binning on the filtered image to generate an output image.

5 Claims, 15 Drawing Sheets

$$C_{22} = B_{22} + B_{23} + B_{32} + B_{33} =$$

$$\begin{pmatrix} (A_{11}x1) \\ (A_{12}x3) \\ (A_{13}x3) \\ (A_{14}x1) \\ (A_{21}x3) \\ (A_{22}x9) \\ (A_{23}x9) \\ (A_{24}x3) \\ (A_{31}x3) \\ (A_{32}x9) \\ (A_{33}x9) \\ (A_{34}x3) \\ (A_{41}x1) \\ (A_{42}x3) \\ (A_{43}x3) \\ (A_{44}x1) \end{pmatrix} \times 1/64 \quad +) \begin{pmatrix} x1 & x3 & x3 & x1 \\ x3 & x9 & x9 & x3 \\ x3 & x9 & x9 & x3 \\ x1 & x3 & x3 & x1 \end{pmatrix} \times 1/64$$

$$= \begin{pmatrix} \underbrace{\begin{matrix}(A_{11}x1)\\(A_{12}x3)\\(A_{13}x3)\\(A_{14}x1)\end{matrix}}_{x1} \\ \underbrace{\begin{matrix}(A_{21}x1)\\(A_{22}x3)\\(A_{23}x3)\\(A_{24}x1)\end{matrix}}_{x3} \\ \underbrace{\begin{matrix}(A_{31}x1)\\(A_{32}x3)\\(A_{33}x3)\\(A_{34}x1)\end{matrix}}_{x3} \\ \underbrace{\begin{matrix}(A_{41}x1)\\(A_{42}x3)\\(A_{43}x3)\\(A_{44}x1)\end{matrix}}_{x1} \end{pmatrix} \times 1/64 \quad +) \begin{pmatrix} x1 & x3 & x3 & x1 \\ x1 & x3 & x3 & x1 \\ x1 & x3 & x3 & x1 \\ x1 & x3 & x3 & x1 \end{pmatrix} \times 1/64 = \begin{pmatrix} 1/4 & 3/4 & 3/4 & 1/4 \\ 1/4 & 3/4 & 3/4 & 1/4 \\ 1/4 & 3/4 & 3/4 & 1/4 \\ 1/4 & 3/4 & 3/4 & 1/4 \end{pmatrix} \begin{matrix} x1/16 \\ x3/16 \\ x3/16 \\ x1/16 \end{matrix}$$

FIG. 11B

METHOD FOR IMAGE PROCESSING CIRCUIT AND RELATED SAMPLING CIRCUIT

CROSS REFERENCE TO RELATED APPLICATIONS

This application claims the benefit of U.S. Provisional Application No. 63/184,806, filed on May 6, 2021, the contents of which are incorporated herein by reference.

BACKGROUND OF THE INVENTION

1. Field of the Invention

The present invention relates to an image processing method and a related sampling circuit, and more particularly, to an image processing method and a related sampling circuit for processing a fingerprint image.

2. Description of the Prior Art

In recent years, optical fingerprint recognition has become one of the most popular fingerprint recognition schemes, and a display panel is usually integrated with an optical fingerprint sensor for capturing fingerprint images of a touch finger on the panel. If the sampling rate of the fingerprint sensor is close to or lower than the pixel size, the sensed fingerprint image may appear a distortion, called the moiré pattern. If the pitch of the moiré pattern is close to the pitch of a fingerprint, the moiré signal may be determined as a user's fingerprint which may be previously registered, resulting in that the finger of any person can be matched successfully.

Please refer to FIG. 1, which is a schematic diagram of an in-display fingerprint recognition system integrated with an organic light-emitting diode (OLED) panel. In the system, the OLED panel is superimposed on the lens, and a fingerprint sensor is below the lens. When the fingerprint sensor receives a fingerprint image reflected by the finger, the light has to pass through the OLED pixel array on the panel before reaching the fingerprint sensor. In other words, the OLED pixel array may interfere with the sensed fingerprint image, e.g., by blocking partial light reflected from the touch finger. In such a situation, if the resolution of sensing pixels on the fingerprint sensor is insufficient (e.g., the dimension of the sensing pixels on the fingerprint sensor is close to or less than the dimension of the OLED pixels), the fingerprint image will be affected by the OLED pixels and a moiré pattern may be generated. The moiré effect degrades the quality and resolution of the fingerprint image. FIG. 2 illustrates an exemplary fingerprint image interfered with by the moiré pattern, where redundant arc lines other than the fingerprint appear in the image.

Currently, the problem of moiré pattern is usually solved by rotating the sampling angle. Through the rotation of angle, different frequencies of sampling space may be generated to avoid or mitigate the moiré signals that interfere with the fingerprint. However, the rotation of a chip significantly increases the occupied space (i.e., increases the chip size), and it is difficult to obtain the optimal rotation angle for various OLED panel structures.

Thus, there is a need to provide a more effective method for solving the problem of moiré pattern, to improve the quality of fingerprint images without an excessive increase of chip size or degraded fingerprint recognition performance.

SUMMARY OF THE INVENTION

It is therefore an objective of the present invention to provide a method for an image processing circuit and a related sampling circuit for processing the fingerprint image, in order to solve the problem of moiré pattern.

An embodiment of the present invention discloses a method for an image processing circuit. The method comprises steps of: receiving a fingerprint image; performing a low-pass filtering on the fingerprint image to remove a moiré signal on the fingerprint image, to generate a filtered image; and performing a data binning on the filtered image to generate an output image.

Another embodiment of the present invention discloses a sampling circuit of an image processing circuit configured to receive a fingerprint image. The sampling circuit comprises a plurality of sampling capacitors and a readout circuit. The plurality of sampling capacitors comprise at least one first sampling capacitor and at least one second sampling capacitor. The at least one first sampling capacitor, coupled to a first pixel through a first channel, is configured to receive first pixel data from the first pixel. The at least one second sampling capacitor, coupled to the first pixel through a second channel, is configured to receive the first pixel data from the first pixel. The readout circuit, coupled to the plurality of sampling capacitors, is configured to selectively read out at least one of the first pixel data stored in the at least one first sampling capacitor and the first pixel data stored in the at least one second sampling capacitor.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 11A and 11B are schematic diagrams illustrating the combination of the operations of discrete Gaussian filter and data binning according to an embodiment of the present invention.

DETAILED DESCRIPTION

Figure 1:
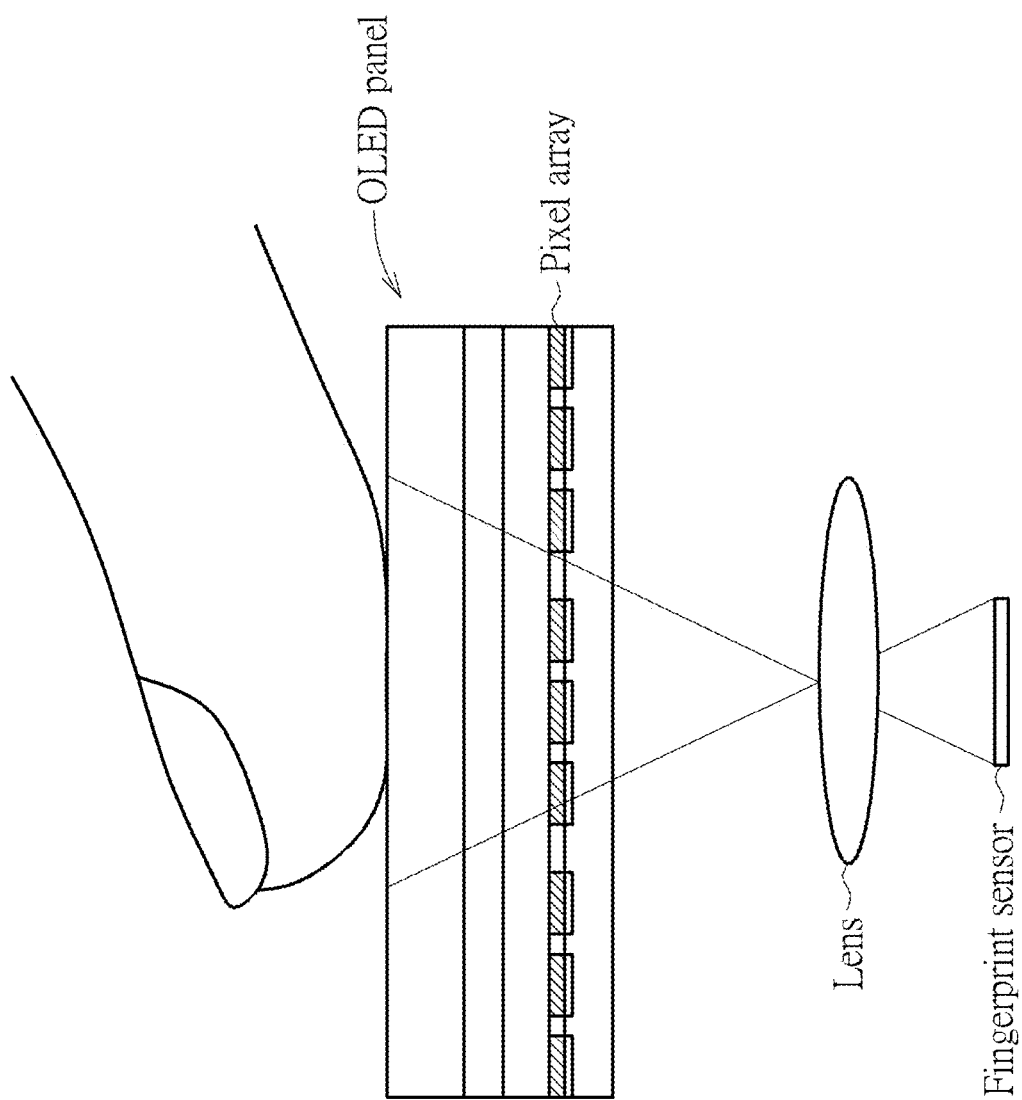
FIG. 1 is a schematic diagram of an in-display fingerprint recognition system integrated with an OLED panel.
Figure 2:
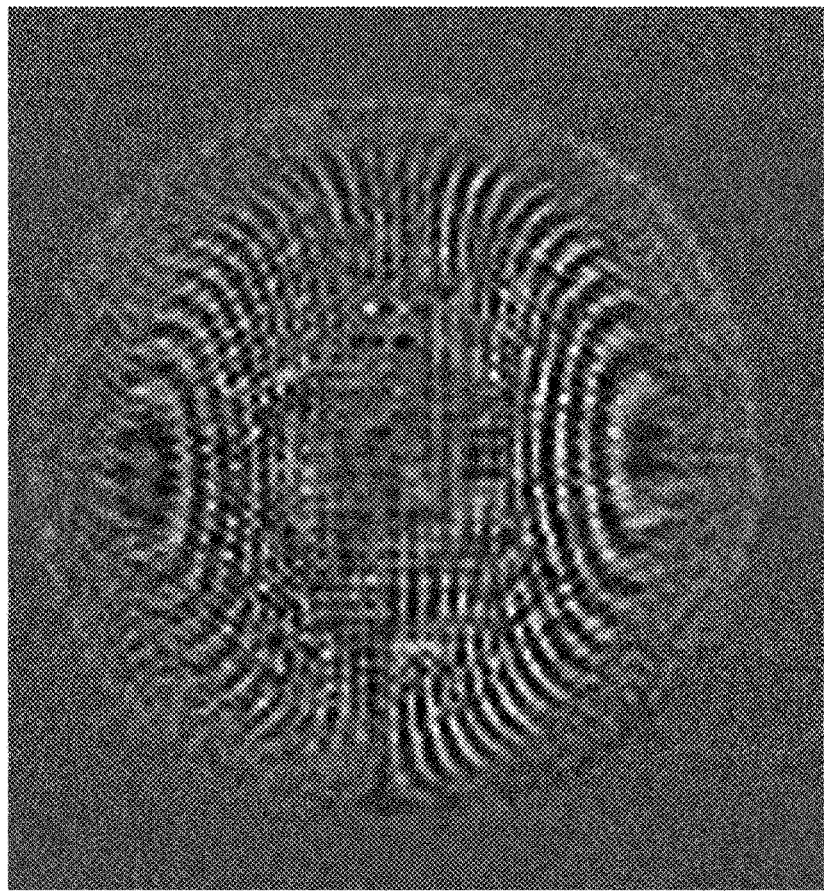
FIG. 2 illustrates an exemplary fingerprint image interfered with by the moiré pattern.
Figure 3:
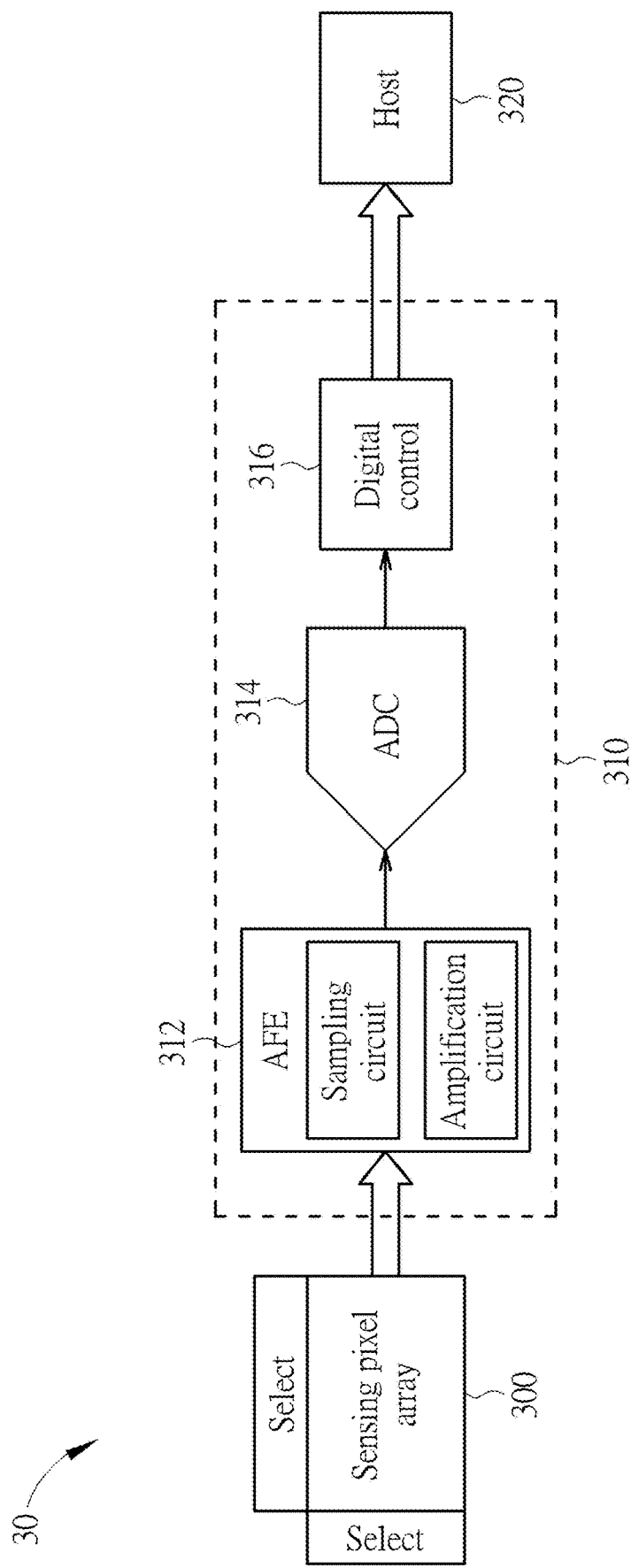
FIG. 3 is a schematic diagram of a fingerprint sensing system according to an embodiment of the present invention.

Please refer to FIG. 3, which is a schematic diagram of a fingerprint sensing system 30 according to an embodiment of the present invention. As shown in FIG. 3, the fingerprint sensing system 30 includes a fingerprint sensor 300, an image processing circuit 310 and a host device 320. The fingerprint sensor 300 may include a sensing pixel array and row/column select circuits. The select circuits are configured to scan the sensing pixels, allowing each sensing pixel to output a pixel data, where the pixel data of the sensing pixels may construct an entire fingerprint image.

The pixel data output from the sensing pixel array are received and processed by the image processing circuit 310, which includes an analog front-end (AFE) circuit 312, an analog-to-digital converter (ADC) 314 and a digital control circuit 316. The AFE circuit 312 includes a sampling circuit and an amplification circuit. In detail, the sampling circuit may include several sampling capacitors, for sampling and storing (holding) the pixel data. The amplification circuit may include one or more gain amplifiers, for amplifying the fingerprint information carried in the pixel data. The pixel data after amplification may be sent to the ADC 314, which converts the analog pixel data into the digital form. The digital image data then undergoes digital signal processing in the digital control circuit 316. The digital signal processing performed in the digital control circuit 316 may include, but not limited to, noise cancellation, common-mode offset compensation, and filtering, etc.

The image processing circuit 310 may be coupled to the host device 320 through an interface such as the serial peripheral interface (SPI). After the signal processing on the image data is complete, the image data may be sent to the host device 320, which performs fingerprint recognition by matching the received fingerprint image with the feature information of a registered fingerprint and may perform any operation (such as device unlocking) based on the fingerprint recognition result. The host device 320 may be a central processing unit (CPU), microcontroller unit (MCU), microprocessor, application processor (AP), application specific integrated circuit (ASIC), or any other possible processing device. The image processing circuit 310 may be implemented in an integrated circuit (IC). In an embodiment, the image processing circuit 310 may be integrated with the fingerprint sensor 300 in a fingerprint sensor IC. In another embodiment, the fingerprint sensor 300 may be integrated with the display panel, and the image processing circuit 310 may be implemented in an IC coupled to the display panel and the fingerprint sensor 300.

Figure 4:
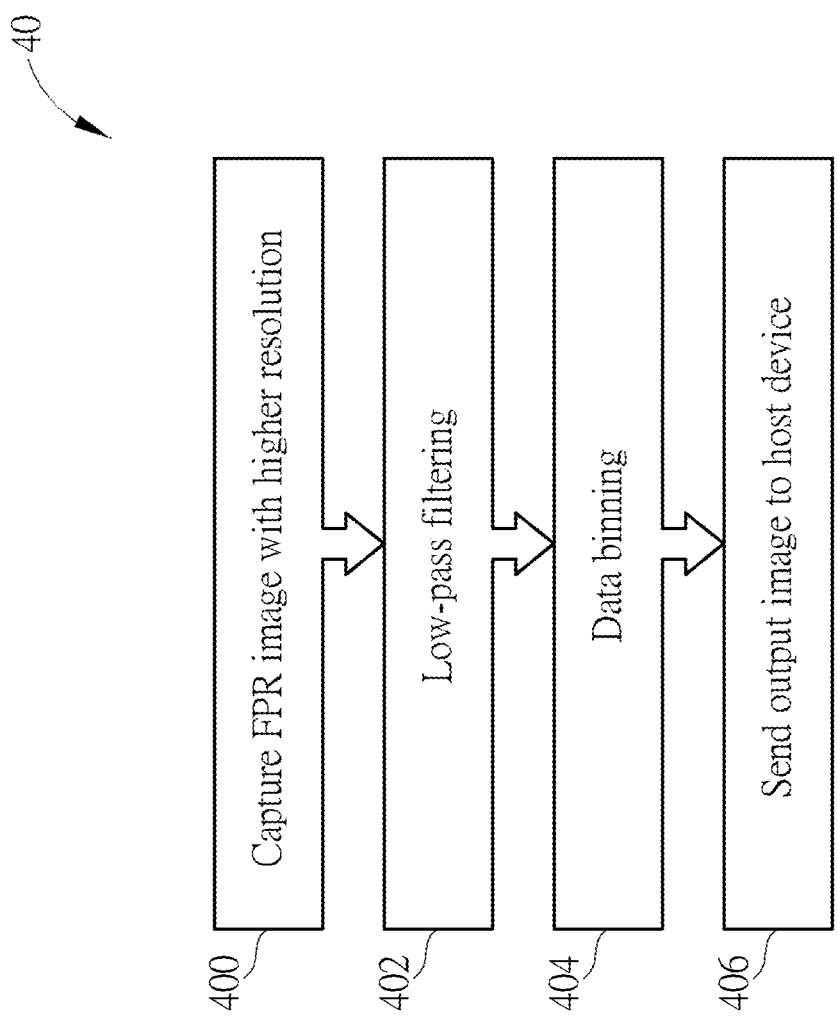
FIG. 4 is a flowchart of an image processing process according to an embodiment of the present invention.

Please refer to FIG. 4, which is a flowchart of an image processing process 40 according to an embodiment of the present invention. The image processing process 40 may be implemented in an image processing circuit, such as the image processing circuit 310 shown in FIG. 3. As shown in FIG. 4, the image processing process 40 includes the following steps:

Step 400: Capture a fingerprint (FPR) image with a higher resolution.

Step 402: Perform low-pass filtering on the fingerprint image to generate a filtered image.

Step 404: Perform data binning on the filtered image to generate an output image.

Step 406: Send the output image to the host device.

According to the image processing process 40, the fingerprint image may be received with a higher resolution. In an embodiment, the fingerprint sensor 300 may include more sensing pixels in the sensing region; hence, the image processing circuit 310 may capture the pixel data to construct the fingerprint image with the higher resolution, i.e., higher sampling frequency. With the higher resolution sampling, a low frequency moiré pattern that might interfere with the fingerprint image may not be generated (i.e., may be moved to a higher frequency).

In order to filter out the high frequency moiré signals or distortions, the image processing circuit 310 may perform low-pass filtering on the fingerprint image. Subsequently, the filtered image after low-pass filtering may be merged through data binning to generate the output image. Through the data binning, several image data in the filtered image are combined to one image data. The image processing circuit 310 then sends the output image after binning to the host device 320, e.g., through the SPI, for further fingerprint matching and recognition. Through the data binning, the image processing circuit 310 may not need to output excessively large data quantities to the host device 320; hence, the required transmission time may be limited within a preferable level. With the operations of low-pass filtering and data binning, the interference of the moiré pattern in the fingerprint image may be effectively eliminated without rotating the chip.

In the prior art, the problem of moiré pattern is usually solved by rotating the sampling angle. It is difficult to obtain the optimal rotation angle for the panel structure. As for different types of display panels, the rotation requirement may be different, and the optimal rotation angle should be obtained after a great number of test procedures and verifications. In comparison, in the present invention, the problem of moiré pattern is solved by using a higher resolution to sample the fingerprint image, performing low-pass filtering to filter out the high frequency moiré signal, and then performing data binning to recover the original output data quantity. In such a situation, the removal of the moiré pattern will be irrelative to the rotation angle. More specifically, the moiré pattern may be effectively removed without rotating the sampling angle.

In an embodiment, the low-pass filtering and data binning may be performed in the digital control circuit 316. More specifically, when the image processing circuit 310 receives the fingerprint image, the image data may be sampled and amplified in the AFE circuit 312, and then undergo analog-to-digital conversion in the ADC 314. The corresponding fingerprint image data in digital form may be generated and stored in a frame buffer or line buffer. Subsequently, the digital control circuit 316 performs low-pass filtering on the fingerprint image data, and the filtered image data are further merged through data binning in the digital control circuit 316.

Figure 5:
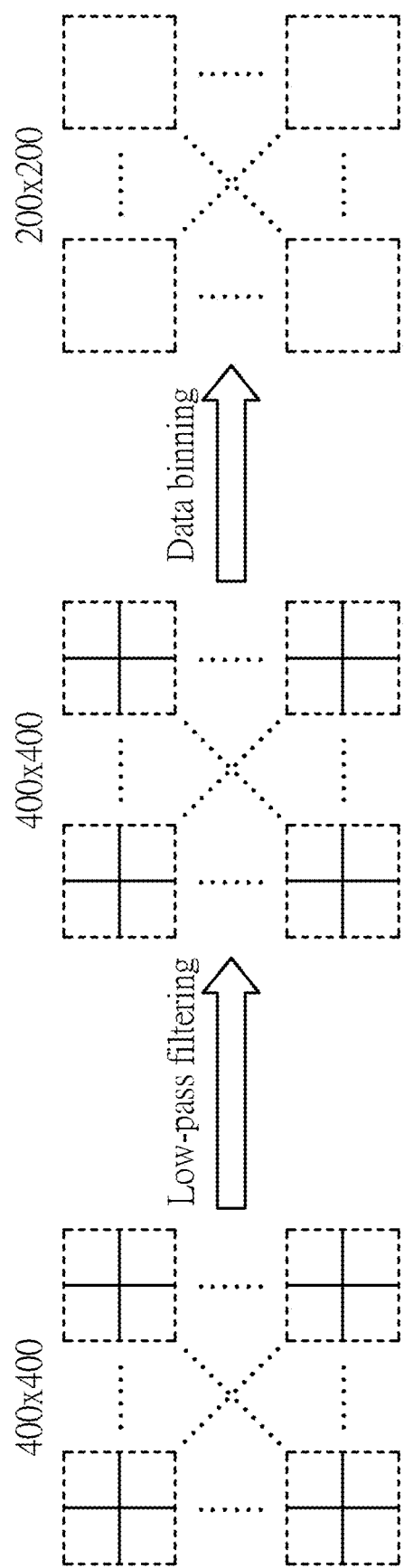
FIG. 5 is a schematic diagram of the low-pass filtering and data binning performed on the fingerprint image according to an embodiment of the present invention.

Please refer to FIG. 5, which is a schematic diagram of the low-pass filtering and data binning performed on the fingerprint image according to an embodiment of the present invention. As shown in FIG. 5, suppose that the resolution of the pixel data in the output image is determined to be 200×200. With the implementation of higher resolution, the pixel array in the fingerprint sensor 300 may be deployed to have 400×400 sensing pixels to achieve double resolution in both the horizontal direction and vertical direction. In other words, the pitch of pixels in the horizontal direction and the pitch of pixels in the vertical direction are both divided by 2.

Therefore, if a sensing region originally contains 200×200 pixels and is configured to output 200×200 pixel data, the present invention may use 400×400 pixels in the same region and correspondingly acquire 400×400 pixel data. The data quantity may remain unchanged after the low-pass filtering operation. Through the data binning, the 400×400 pixel data may be restored to 200×200 output data. In this embodiment, every 2×2 adjacent pixel data after low-pass filtering are combined to generate one output image data in the output image.

Figure 6:
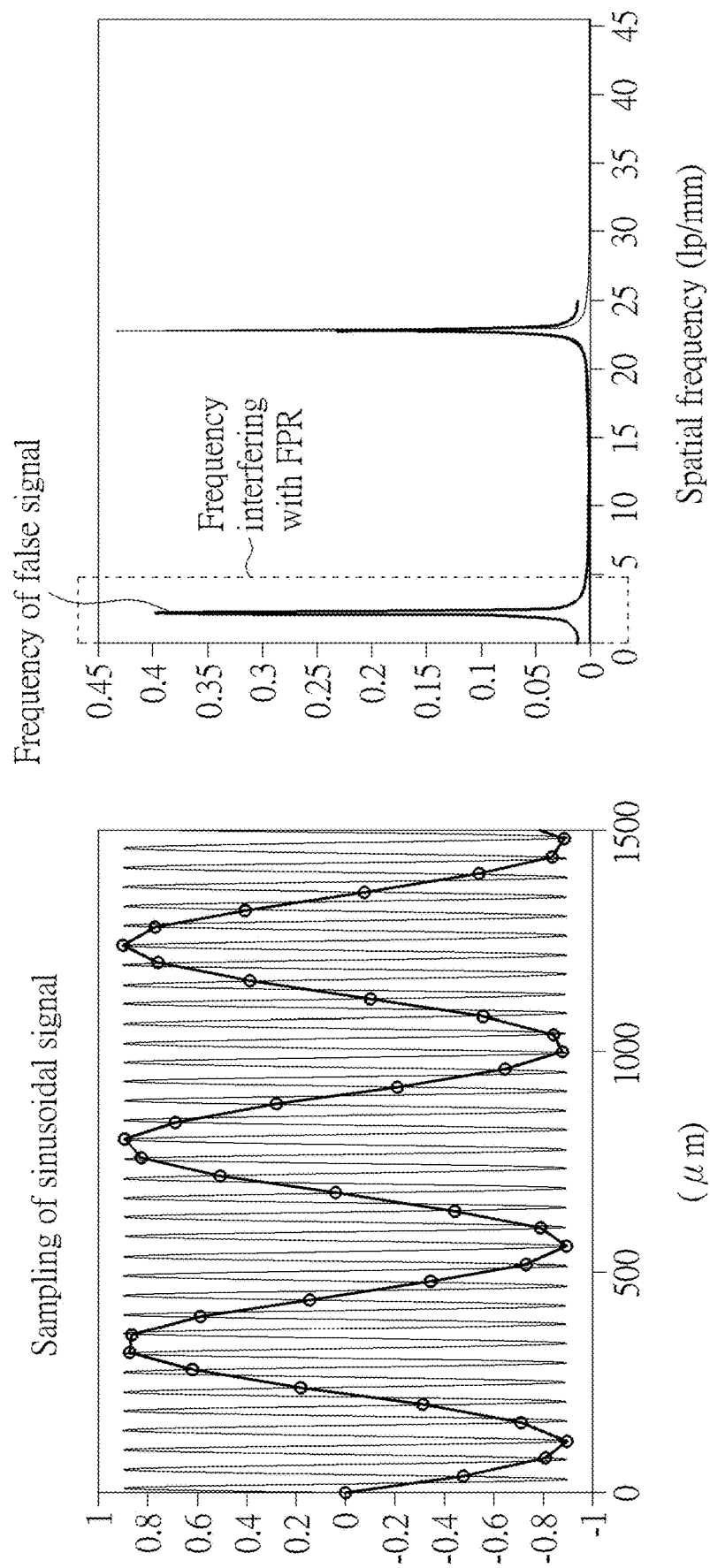
FIG. 6 illustrates how the insufficient sampling frequency causes distortion of sampling to generate the moiré pattern.

FIG. 6 illustrates how the insufficient sampling frequency causes distortion of sampling to generate the moiré pattern. The left figure shows the sampling in the fingerprint sensor in terms of spatial frequency, and the right figure shows the spectrum analysis of the sampled signals. Suppose that the fingerprint sensor having multiple sensing pixels is superposed on an organic light-emitting diode (OLED) panel composed of multiple OLED pixels. When the pitch of the sensing pixels is close to or greater than the pitch of the OLED pixels, an aliasing effect may appear during sampling to generate a distorted signal. As shown in FIG. 6, assuming that the sampling frequency (i.e., the spatial frequency of the sensing pixels) is 1/40.1 lp/μm (line pairs per micrometer) while the spatial frequency formed by the OLED pixels is 1/44 lp/μm, a false signal (i.e., the moiré signal) with a frequency equal to 1/452 lp/μm may be generated in the sampling result. Since the frequency of the fingerprint signals usually falls between 0-5 lp/mm, the frequency of the above moiré signal coincides with the frequency of the fingerprint signals and cannot be filtered out, thereby interfering with the operations of fingerprint recognition.

Figure 7:
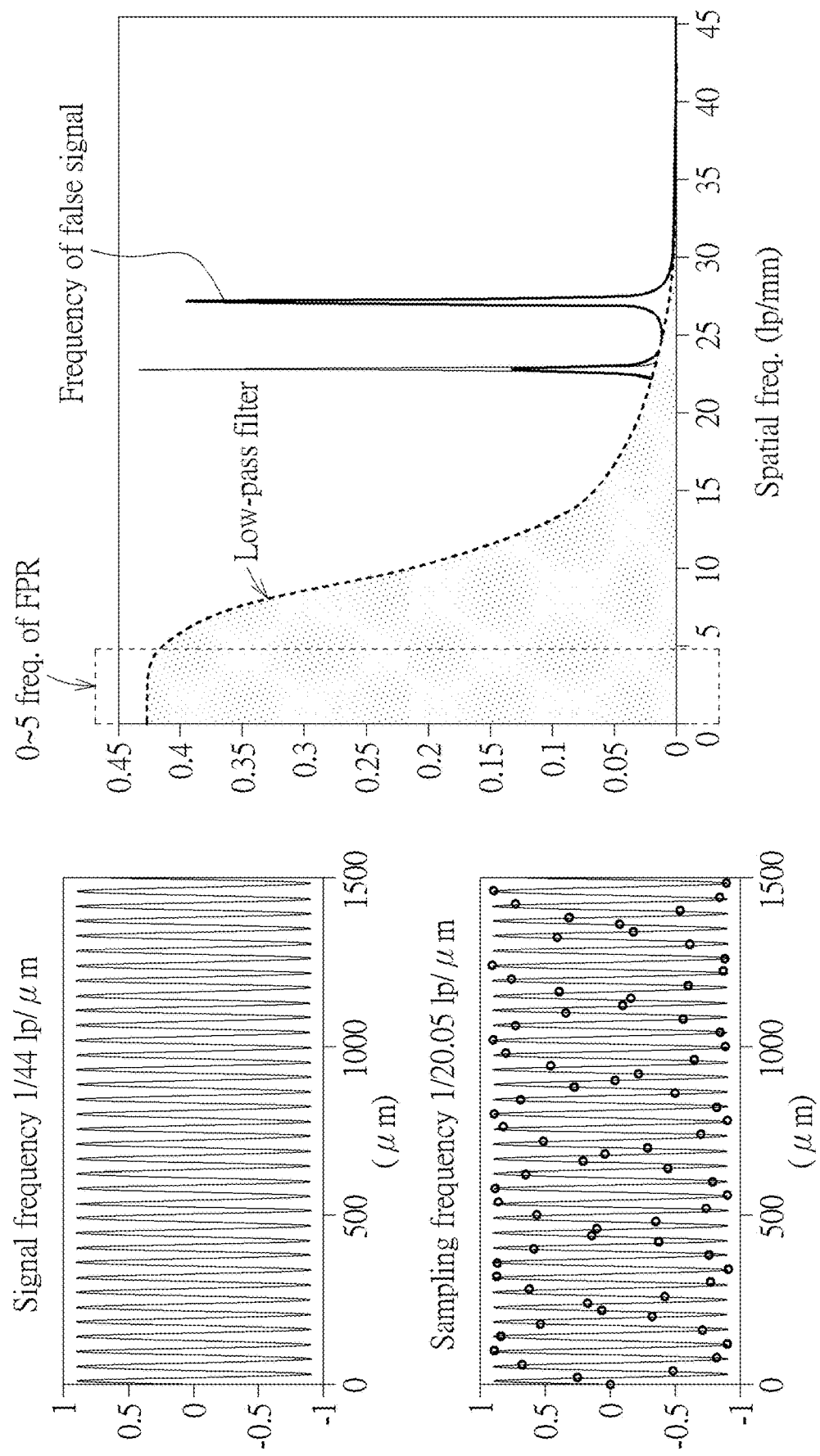
FIG. 7 illustrates the waveforms of using a low-pass filter to filter out the moiré signal.

According to an embodiment of the present invention, the sampling frequency may be doubled to achieve a resolution equal to 1/20.05 lp/um. In such a situation, the frequency of moiré signal generated through sampling is about 1/37 lp/um, which is obviously far away from the fingerprint frequency (0-5 lp/mm). The moiré signal may be filtered out through a low-pass filter, where the low-frequency fingerprint signal is retained, as shown in FIG. 7. In other words, when the sampling frequency is doubled, the obtained signal still includes a false signal, but this false signal does not affect the fingerprint signal; instead, this false signal may be filtered out through a low-pass filter. The data binning is then performed to reduce the output data quantity, so as to prevent excessively much output data resulting from the higher resolution. Since the false signal is filtered out, the final output fingerprint image may be prevented from being interfered with by the moiré pattern.

In a preferable embodiment, the low-pass filtering may be performed through a discrete Gaussian filter. The discrete Gaussian filter may be implemented only through simple digital logic circuits without complex calculation; hence, it may be implemented in hardware circuits, and no additional processor or complex calculation module is required. In other words, the discrete Gaussian filter may be easily implemented in the image processing circuit 310 without intervention of the host device 320 or any other processor module.

Figure 8:
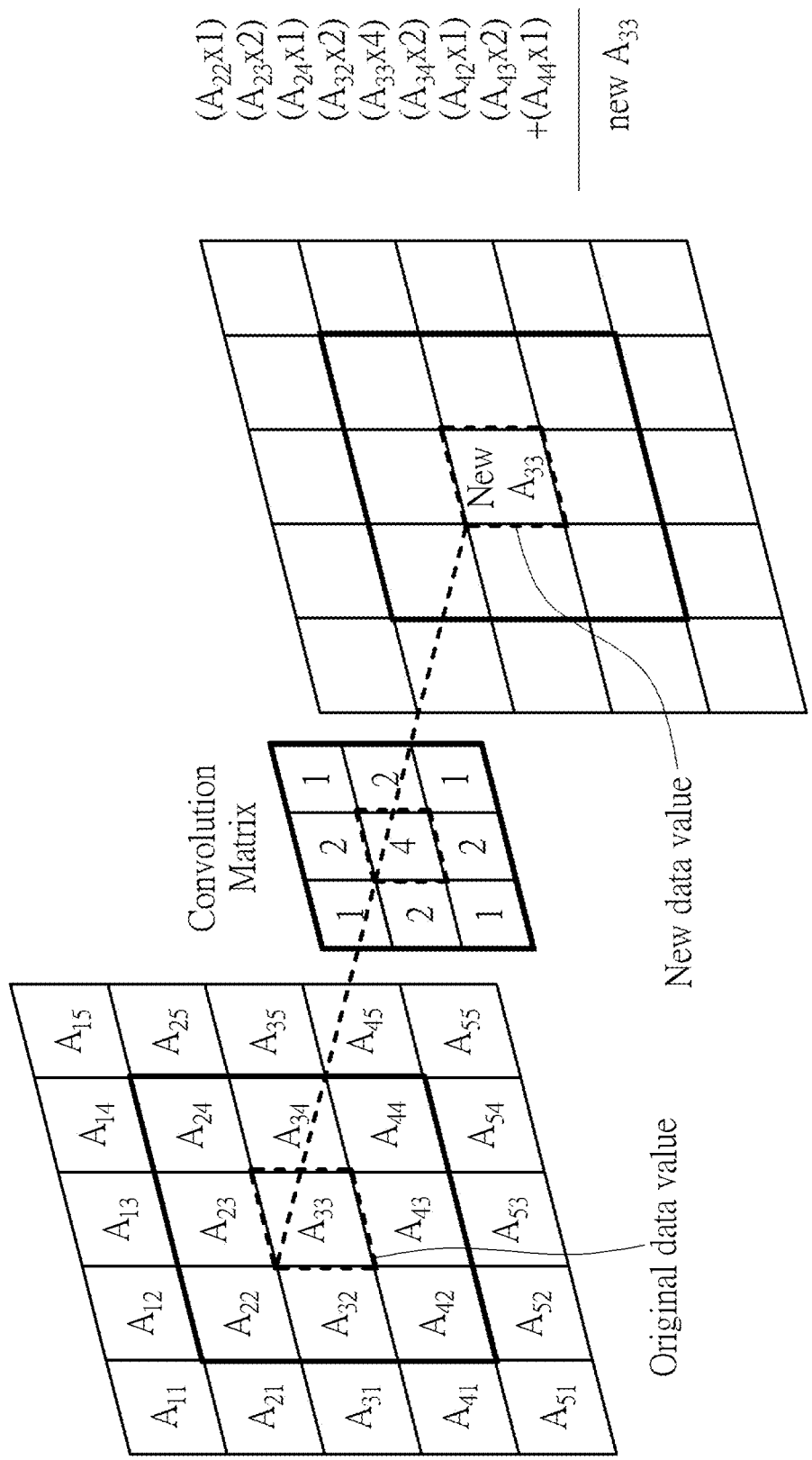
FIG. 8 is a schematic diagram of a 3×3 Gaussian filter.

Please refer to FIG. 8, which is a schematic diagram of a 3×3 Gaussian filter, which may be the simplest Gaussian filter. As shown in FIG. 8, the Gaussian filter may use a 3×3 matrix having values in Gaussian distribution to perform convolution on adjacent 3×3 pixel data. Taking the pixel $A_{33}$ as an example, the filtered data value of the pixel $A_{33}$ may be generated based on the adjacent 9 pixel data. A plurality of coefficients corresponding to these adjacent pixel data are generated, and the convolution may be performed on the 9 pixel data with a convolution matrix having corresponding coefficients to generate the filtered image data.

In detail, in the convolution operation, the data values of the pixels $A_{22}, A_{23}, A_{24}, A_{32}, A_{33}, A_{34}, A_{42}, A_{43}$ and $A_{44}$ may be multiplied by the corresponding coefficients 1, 2, 1, 2, 4, 2, 1, 2 and 1, respectively, and these multiplication results are summed up. Based on the Gaussian filter, the central pixel has the largest weight (i.e., largest coefficient), and the pixel weight decreases as its distance from this central pixel is farther, so as to average the values of the adjacent pixels. As a result, by calculating the value of each pixel in this way, the low-pass filtering effect may be realized.

In an embodiment, the summation may be divided by the total weight 16 to obtain a new data value of the pixel $A_{33}$. Alternatively, the summation may be served as the output data to be processed in the subsequent circuit.

Figure 9:
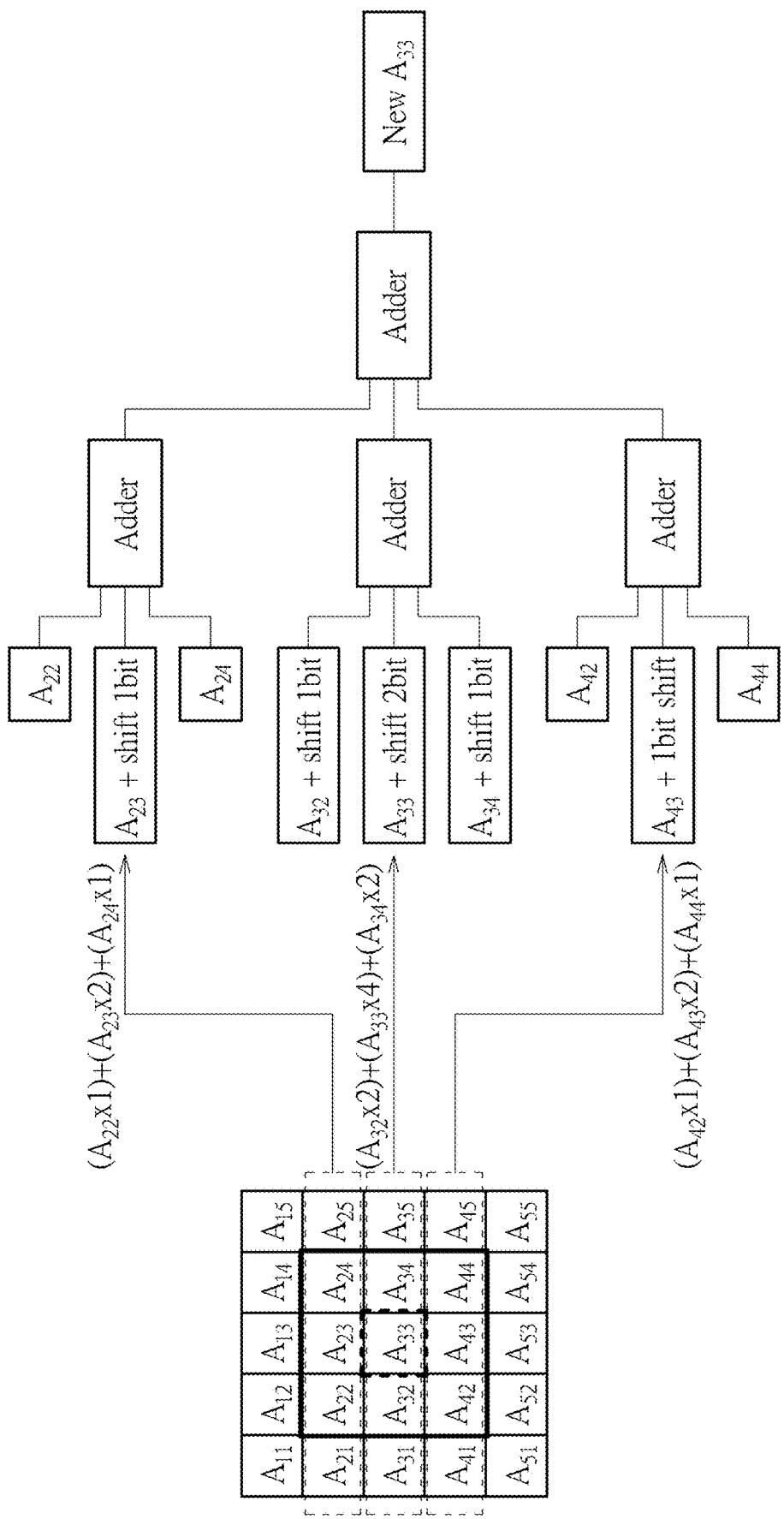
FIG. 9 is a schematic diagram of the convolution implemented in the hardware circuit according to an embodiment of the present invention.

The following paragraphs explain how the discrete Gaussian filter can be implemented in the hardware circuit as included in the image processing circuit 310. Please refer to FIG. 9 along with FIG. 8, where the convolution includes multiplication and addition operations. In the hardware circuit of the image processing circuit 310, the addition operation may be performed by using an adder composed of simple logic circuits. The adder is a commonly used element in the digital circuit such as the digital control circuit 316 of the image processing circuit 310 shown in FIG. 3. The multiplication operation may be performed by shifting the bits in the pixel data. For example, shifting each data value to a higher bit by one position and adding one "0" in the least significant bit are equivalent to multiplying by 2, and shifting each data value to a higher bit by two positions and adding two "0"s in the least significant bits are equivalent to multiplying by 4. In an embodiment, the data may be moved to a buffer or register corresponding to different bits during data transfer, so as to realize data shifting easily. In addition, the summed data (New $A_{33}$ in FIG. 9) may be divided by the total weight 16, and this division operation may also be performed by shifting each data value to a lower bit by 4 positions.

Figure 10:
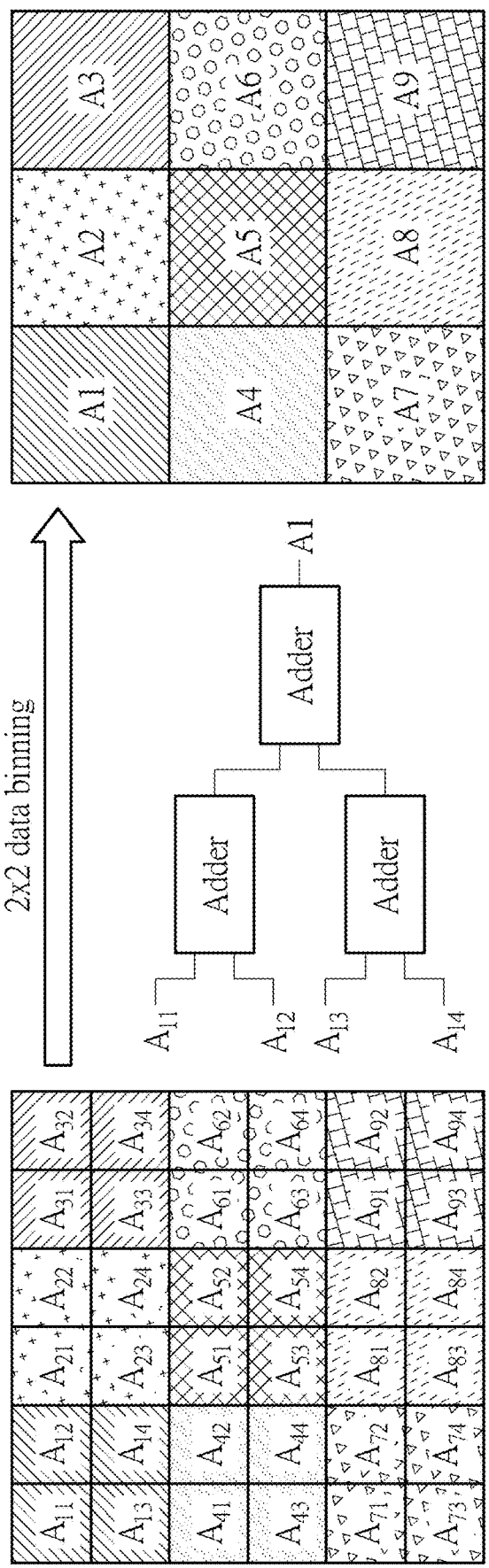
FIG. 10 is a schematic diagram of the data binning implemented in the hardware circuit according to an embodiment of the present invention.

The data after low-pass filtering may further be merged through data binning. Similarly, the data binning may also be implemented in simple hardware circuits. As shown in FIG. 10, since every adjacent 2×2 image data are restored to 1 output data, the adjacent pixel data may be summed up through adders composed of simple logic circuits. In this embodiment, 6×6 image data are merged to generate 3×3 output data $A_1$-$A_9$. For example, the output data A1 is the summation of the image data $A_{11}, A_{12}, A_{13}$ and $A_{14}$, which may be summed up through adders in the image processing circuit.

In the above embodiment, the fingerprint image data undergo the low-pass filtering and then the data binning in the image processing circuit to generate the output data to be sent to the host device. In another embodiment, the operations of the low-pass filtering and data binning may be combined; that is, the coefficients of the digital Gaussian filter and the data binning may be merged, so as to simplify the computation and thereby save the computation resources.

Figure 11A:
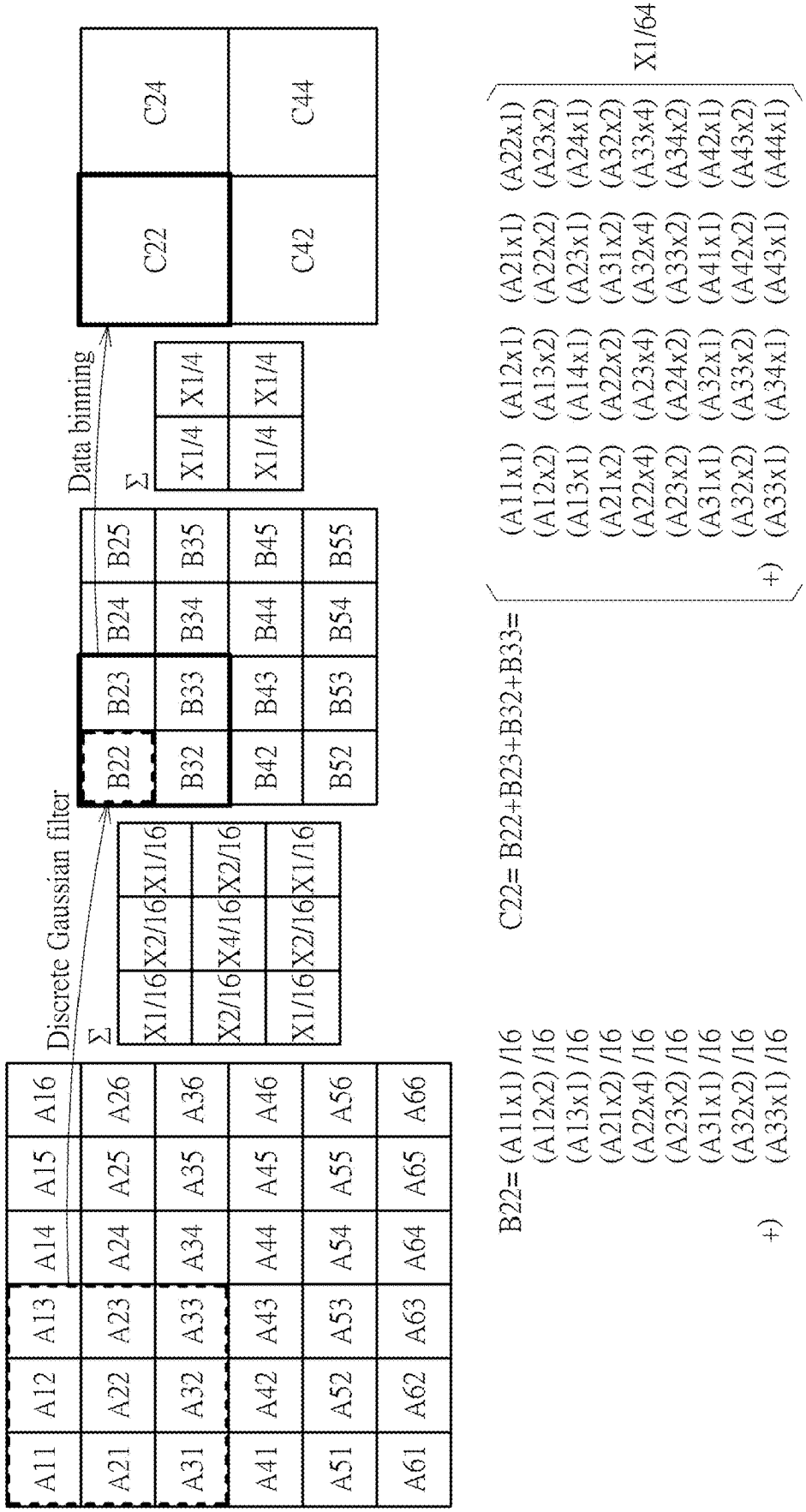

Please refer to FIGS. 11A and 11B, which are schematic diagrams illustrating the combination of the operations of discrete Gaussian filter and data binning according to an embodiment of the present invention. As shown in FIG. 11A, the input pixel data A11-A66 received from the fingerprint sensor may pass through the 3×3 Gaussian filter to generate filtered image data B22-B55 with appropriate coefficients. The filtered image data B22-B55 may be merged with data binning to generate the output image data C22, C24, C42 and C44, where every 2×2 adjacent filtered image data are merged to 1 output image data. In other words, the coefficient of each filtered image data is ¼, and the output image data is an average of 4 adjacent filtered image data. Therefore, each of the output image data C22, C24, C42 and C44 may be calculated based on the input pixel data A11-A66 with appropriate coefficients determined based on the combination of the Gaussian filter and data binning. For example, as shown in FIG. 11A, the output image data C22 may be expressed in terms of the input pixel data A11-A44 with appropriate coefficients.

The coefficients of the output image data C22 in terms of the input pixel data A11-A44 may further be synthesized, as shown in FIG. 11B. More specifically, based on the combination of the Gaussian filter and data binning, each output image data may be obtained from the pixel data of a 4×4 pixel array multiplied by coefficients as follows:

$$\begin{bmatrix} 1/64 & 3/64 & 3/64 & 1/64 \\ 3/64 & 9/64 & 9/64 & 3/64 \\ 3/64 & 9/64 & 9/64 & 3/64 \\ 1/64 & 3/64 & 3/64 & 1/64 \end{bmatrix},$$

and these coefficients may be rearranged as:

$$\begin{bmatrix} 1/4 & 3/4 & 3/4 & 1/4 \\ 1/4 & 3/4 & 3/4 & 1/4 \\ 1/4 & 3/4 & 3/4 & 1/4 \\ 1/4 & 3/4 & 3/4 & 1/4 \end{bmatrix} \begin{matrix} \times 1/16 \\ \times 3/16 \\ \times 3/16 \\ \times 1/16 \end{matrix}.$$

In this manner, the combination of the Gaussian filter and data binning may form a first spatial filtering in a first dimension and a second spatial filtering in a second dimension, where the first spatial filtering has coefficients ¼, ¾, ¾ and ¼ for 4 consecutive pixel data along a first direction (e.g., horizontal direction) and the second spatial filtering has coefficients 1/16, 3/16, 3/16 and 1/16 for 4 consecutive pixel data along a second direction (e.g., vertical direction).

For example, the input pixel data A11, A12, A13 and A14 in the first row may be merged with the coefficients ¼, ¾, ¾ and ¼ (i.e., the first spatial filtering) to generate an intermediate data D12; that is:

$D12 = ¼A11 + ¾A_{12} + ¾A13 + ¼A14.$

In similar manners, intermediate data D22, D32 and D42 corresponding to the second to fourth rows may be obtained as follows:

$D22 = ¼A21 + ¾A22 + ¾A23 + ¼A24;$ $D32 = ¼A31 + ¾A32 + ¾A33 + ¼A34;$ $D42 = ¼A41 + ¾A42 + ¾A43 + ¼A44.$

Subsequently, the output image data C22 may be obtained by performing the second spatial filtering on the intermediate data D12, D22, D32 and D42, as follows:

$C22 = 1/16 D12 + 3/16 D22 + 3/16 D32 + 1/16 D42.$

Figure 12:
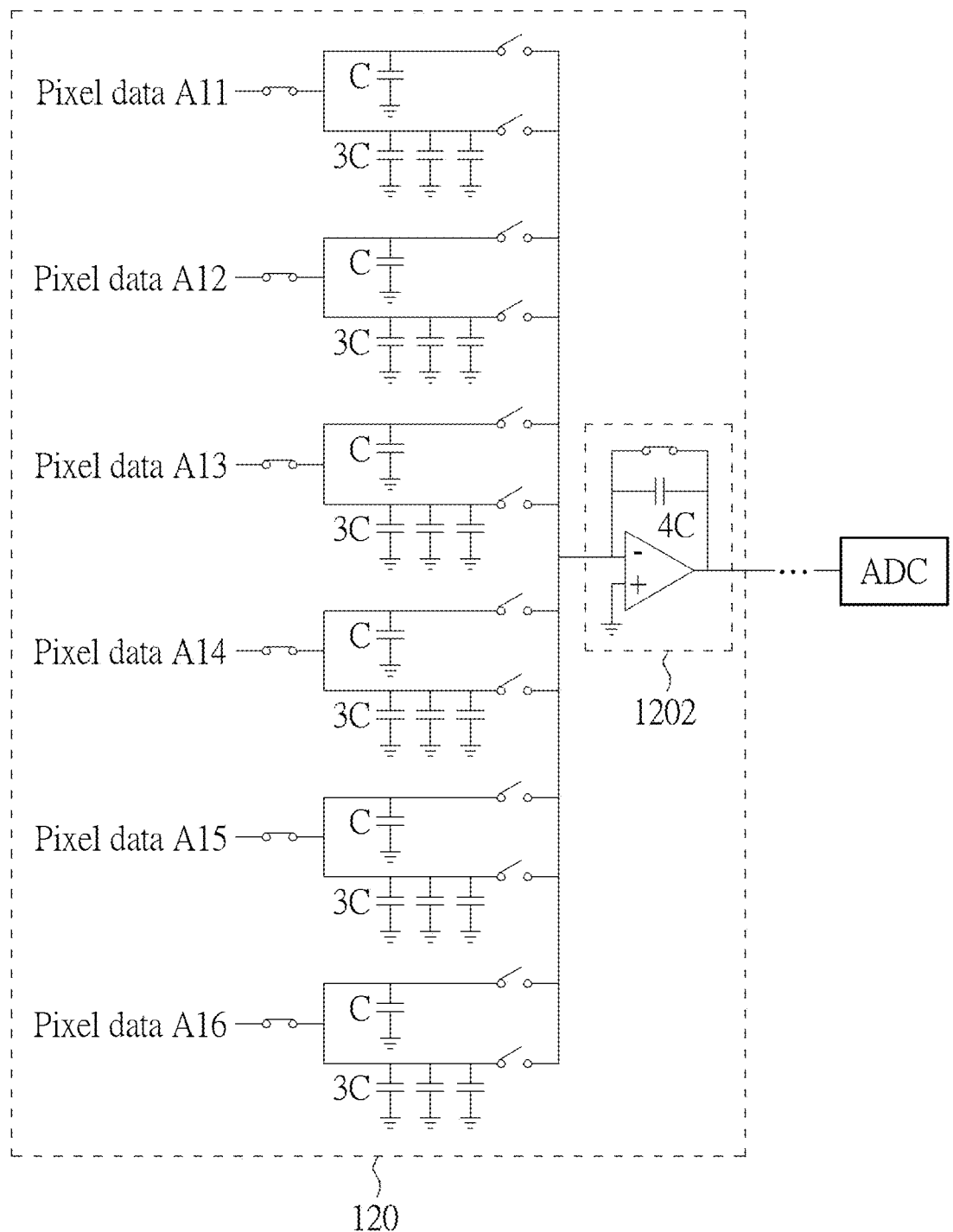
FIG. 12 is a schematic diagram of a sampling circuit according to an embodiment of the present invention.

The above rearrangement of coefficients allows the computation to be performed in the sampling circuit of the AFE circuit 312, thereby reducing the number of times of the required sampling operations. Please refer to FIG. 12, which is a schematic diagram of a sampling circuit 120 according to an embodiment of the present invention. As shown in FIG. 12, the sampling circuit 120 includes a plurality of sampling capacitors and a readout circuit 1202. An ADC, which is coupled to the output terminal of the readout circuit 1202, may not be included in the sampling circuit 120 but illustrated in FIG. 12 to facilitate the illustration. The ADC may be coupled to the sampling circuit 120 through an amplification circuit, and/or the readout circuit 1202 may be considered as a component of the amplification circuit.

The sampling circuit 120 is configured to receive pixel data from multiple sensing pixels, where 6 pixel data A11-A16 from 6 different pixels are illustrated. Each of the sensing pixels is coupled to 4 sampling capacitors, which are configured to receive the pixel data from the corresponding sensing pixel. The sampling capacitors are allocated such that 1 sampling capacitor is considered as a group to be coupled to the sensing pixel through a first channel, and 3 sampling capacitors are considered as a group to be coupled to the sensing pixel through a second channel. In this embodiment, each sampling capacitor has the same capacitance value C; hence, the capacitor in the first channel totally has capacitance value 1C, and the capacitors in the second channel totally have capacitance value 3C. In addition, the readout circuit 1202 may include a readout capacitor having capacitance value 4C.

As mentioned above, the combination of the Gaussian filtering and data binning may form the first spatial filtering with coefficients ¼, ¾, ¾ and ¼ in a first dimension and the second spatial filtering with coefficients 1/16, 3/16, 3/16 and 1/16 in the second dimension. In an embodiment, the first spatial filtering may be implemented in the sampling circuit. Therefore, the sampling capacitors may be allocated according to the coefficients of the first spatial filtering. More specifically, as shown in FIG. 12, the sampling capacitors are allocated such that the first channel has the capacitance value 1C and the second channel has the capacitance value 3C, to be adapted to the coefficients ¼ and ¾ for calculating the output image data.

Figure 13A:
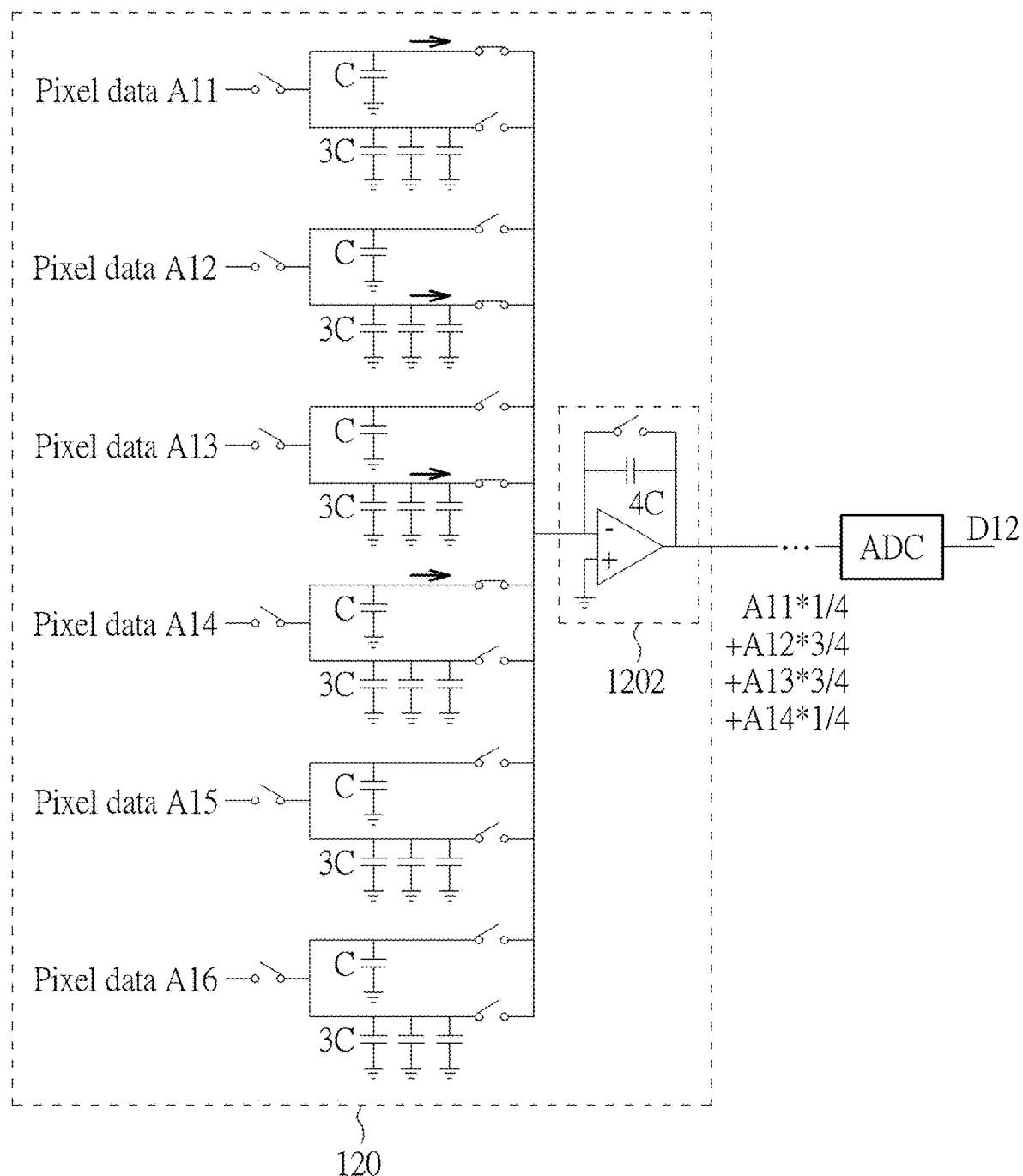
FIGS. 13A and 13B illustrate the operations of the sampling circuit to generate different output image data.

Therefore, since the output image data C22 is generated from the intermediate data D12, D22, D32 and D42, where the intermediate data D12 is generated from the input pixel data A11, A12, A13 and A14 with coefficients ¼, ¾, ¾ and ¼, the readout circuit 1202 may read the input pixel data A11 from the first channel with capacitance 1C, read the input pixel data A12 from the second channel with capacitance 3C, read the input pixel data A13 from the second channel with capacitance 3C, and read the input pixel data A14 from the first channel with capacitance 1C, as shown in FIG. 13A. These coefficients may be appropriately realized based on the sampling capacitor(s) in the corresponding channel along with the readout capacitor included in the readout circuit 1202. In the same way, other input pixel data A22-A44 may be used to generate the intermediate data D22, D32 and D42.

Figure 13B:
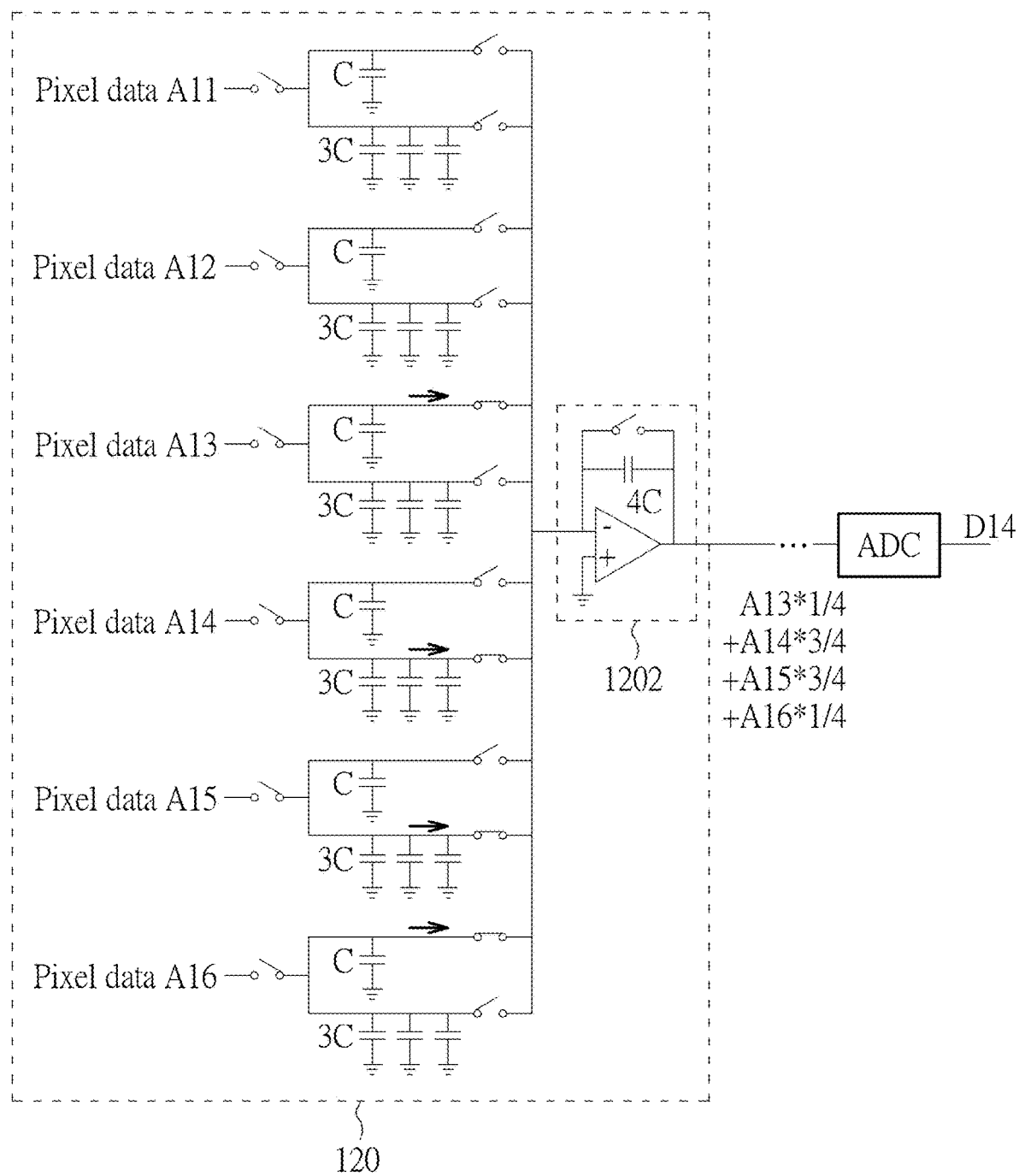

Similarly, in order to generate the output image data C24, the intermediate data D14, D24, D34 and D44 may be used, where the intermediate data D14 is generated from the input pixel data A13, A14, A15 and A16 with coefficients ¼, ¾, ¾ and ¼. In such a situation, the readout circuit 1202 may read the input pixel data A13 from the first channel with capacitance 1C, read the input pixel data A14 from the second channel with capacitance 3C, read the input pixel data A15 from the second channel with capacitance 3C, and read the input pixel data A16 from the first channel with capacitance 1C, as shown in FIG. 13B. In the same way, other input pixel data A23-A46 may be used to generate the intermediate data D24, D34 and D44.

As a result, the sampling capacitors may be allocated appropriately (e.g., 1C and 3C in the two channels), so that the coefficients determined based on the combination of the Gaussian filtering and the data binning may be achieved (e.g., the coefficients ¼ and ¾).

Please note that as shown in FIGS. 13A and 13B, each of the input pixel data A11-A16 may be received and stored in the capacitor (1C) in the first channel and the capacitors (3C) in the second channel through one sampling operation associated with an exposure time. The readout circuit 1202 then reads out the input pixel data from the capacitor(s) in one of the channels for generating an output image data, and reads out the same input pixel data from the capacitor (s) in another one of the channels for generating another output image data. This implementation allows the same sampling operation to be used for different output image data, thereby saving the required sampling operations. Note that after the sampling result in one channel is read out for a first output image data, this sampling result will no longer be used for a second output image data since the electric charges stored in the capacitor (s) are used up. However, the sampling result in another channel can still be used for the second output image data. For example, as for the output image data C22, the coefficient for the input pixel data A13 is ¾, and thus the data in the capacitors (3C) of the second channel is read out; as for the output image data C24, the coefficient for the same input pixel data A13 is ¼, and thus the data in the capacitor (1C) of the first channel can still be read out.

Therefore, the implementation may reduce the required sampling number of times, and thereby reduce the power consumption for the sampling operations. Also, since several coefficients for signal processing are realized in the sampling circuit, the computation operations in the digital control circuit may also be reduced. In addition, if an ADC is used to receive a series of image data sampled from different sensing pixels, the operational speed of the ADC may also be increased due to the reduction of sampling number of times. Alternatively or additionally, the number of ADCs used in the image processing circuit may be saved.

As mentioned above, the combination of the Gaussian filter and data binning may form the first spatial filtering in the first dimension and the second spatial filtering in the second dimension. FIGS. 13A and 13B show that the coefficients of the first spatial filtering may be realized through the allocation of the sampling capacitors. In addition, the second spatial filtering may be performed in the digital control circuit of the image processing circuit. More specifically, the intermediate data (e.g., D12 and D14) obtained in the readout circuit may further be output to the ADC, to be converted into the digital form. The logic circuit in the digital control circuit may further be used to calculate the output image data based on these intermediate data. The related computations including addition, multiplication and division may be realized through adders or bit shifting in a hardware circuit such as the digital control circuit, as described in the above paragraphs.

Please note that the present invention aims at providing a method for an image processing circuit and a related sampling circuit for efficiently removing the moiré pattern generated in a fingerprint image. Those skilled in the art may make modifications and alterations accordingly. For example, the sampling capacitor allocation used in the above embodiment is one of various implementations of the present invention. In another embodiment, the capacitance value 3C may be realized by using a larger capacitor having the triple capacitance value. In addition, since the sampling capacitors are allocated based on the coefficients generated from the combination of Gaussian filter and data binning, the arrangement of capacitance value and the selection scheme for generating the output image data may also be configured accordingly. For example, if the data binning requires that every 3×3 image data are merged to generate an output data, the overall coefficients should be calculated accordingly, and thus the deployment of the sampling capacitors and/or their control method should be adjusted accordingly.

More specifically, if a 3×3 data binning is combined with a 3×3 Gaussian filter, the coefficients of the first spatial filtering may be calculated and determined to be $\frac{1}{12}$, $\frac{3}{12}$, $\frac{4}{12}$, $\frac{3}{12}$ and $\frac{1}{12}$ for 5 consecutive pixel data such as A11-A15. In such a situation, the sampling capacitors may still be deployed to have capacitance value 1C in the first channel and capacitance value 3C in the second channel. The readout circuit may read the input pixel data A11 from the first channel, read the input pixel data A12 from the second channel, read the input pixel data A13 from both the first and second channel, read the input pixel data A14 from the second channel, and read the input pixel data A15 from the first channel. The computations of the related coefficients can be easily derived by a person of ordinary skill in the art in a similar way, and will not be detailed herein.

In addition, in the above embodiment, a readout capacitor having capacitance value 4C is used in the readout circuit for realizing a multiple of ¼. In another embodiment, a readout capacitor having another capacitance value may be used instead. In such a situation, the multiple of ¼ may be inserted into the image signal in the digital domain, or the output image data of the image processing circuit may possess a higher value without being divided by 4. Note that the fingerprint information is carried in the ridge-to-valley difference of the image, and thus the data in the same fingerprint image may be magnified or diminished with the same ratio without affecting the fingerprint recognition effects.

Further, in the above embodiments, a 3×3 Gaussian filter is applied to filter out the high frequency moiré signal. In another embodiment, a 5×5, 7×7, 11×11, or any other Gaussian filter may be applied. A higher level Gaussian filter may be able to filter out the moiré signal more effectively by using more complex computations.

To sum up, the present invention provides an image processing method and a related sampling circuit for efficiently removing the moiré pattern generated in a fingerprint image. In the embodiments of the present invention, the sensing pixels are deployed to receive the fingerprint image with a higher resolution, pushing the moiré signal in the fingerprint image to a higher frequency. A low-pass filter may be used with data binning to process the fingerprint image data. The low-pass filter may filter out the high frequency moiré signal, and the data binning technique is used to reduce the data quantity which has been increased with the sampling of higher resolution. In an embodiment, the low-pass filter may be realized with a discrete Gaussian filter. The discrete Gaussian filter along with the data binning may be implemented using simple hardware circuits without the usage of a complex computation module or processor. Therefore, the operations of low-pass filtering and data binning may be implemented in an image processing IC. In a further embodiment, the operations of low-pass filtering and data binning may be combined to form a first spatial filtering in a first dimension and a second spatial filtering in a second dimension, where the coefficients for calculating the low-pass filtering and data binning are combined. The combined coefficients may be implemented in the sampling circuit of the AFE circuit, where the sampling capacitors may be allocated in multiple channels with appropriate capacitance values to realize the coefficients in the output image data. As a result, the required sampling and computation may be reduced, thereby reducing hardware costs and power consumption.

Those skilled in the art will readily observe that numerous modifications and alterations of the device and method may be made while retaining the teachings of the invention. Accordingly, the above disclosure should be construed as limited only by the metes and bounds of the appended claims

What is claimed is:

1. A method for an image processing circuit, comprising:
receiving a fingerprint image;
performing a low-pass filtering on the fingerprint image to remove a moiré signal on the fingerprint image, to generate a filtered image;
performing a data binning on the filtered image to generate an output image; and
combining the low-pass filtering and the data binning to generate a plurality of first coefficients for generating the output image.

2. The method of claim 1, wherein the low-pass filtering is performed through a discrete Gaussian filter.

3. The method of claim 2, wherein the fingerprint image comprises a plurality of pixel data, and the step of performing the low-pass filtering on the fingerprint image to remove the moiré signal on the fingerprint image to generate the filtered image comprises:
generating a plurality of second coefficients corresponding to the discrete Gaussian filter; and
performing convolution on a pixel data array among the plurality of pixel data with the plurality of second coefficients to generate a filtered image data of the filtered image.

4. The method of claim 3, wherein the convolution comprises an addition operation and a multiplication operation, wherein the addition operation is performed by using an adder of the image processing circuit, and the multiplication operation is performed by shifting at least one bit in one of the plurality of pixel data.

5. The method of claim 1, wherein the step of performing the data binning on the filtered image to generate the output image comprises:
combining a plurality of filtered image data of the filtered image to generate an output image data of the output image.

* * * * *